United States Patent Office 2,807,530
Patented Sept. 24, 1957

2,807,530

METHOD AND COMPOSITION FOR THE CONTROL OF UNDESIRED VEGETATION

Keith C. Barrons, Midland, Mich., assignor to The Dow Chemical Company, Midland, Mich., a corporation of Delaware No Drawing. Application October 6, 1954, Serial No. 460,767

12 Claims. (Cl. 71—2.7)

This invention relates to herbicides and is particularly directed to a composition and method for the suppression of the growth of germinant seeds and undesirable vegetation.

In recent years, the use of chemical materials for the control of the growth of vegetation has found widespread acceptance amongst agriculturists. However, the practice of such control has brought into focus shortcomings in commonly employed procedures. For instance, many of the materials heretofore proposed as herbicides have the property of being capable of selectively controlling only one type of vegetation such as broadleaf weeds. Further, many of these currently used materials are as toxic to established plants as they are to seeds. Thus, it has generally not been possible to obtain a selective control of both broadleaf and narrowleaf species in stands of desirable grass species such as blue grass. Further, many of the herbicides have had only a transitory effect when employed in soil so that several applications have been required in order to obtain persistent control.

It is an object of the present invention to provide a new method for the suppression and control of the growth of undesirable vegetation. Another object is to provide a method for the control of the growth of germinant seeds and emerging seedlings in soil and growth media. A further object is to provide a method for the suppression of the growth of many undesirable plant species in stands of established grasses such as blue grass and creeping red fescue. An additional object is the provision of a method wherein a single soil application gives a residual and extended control of plant growth. Another object is the provision of a novel composition adapted to be employed for the accomplishment of the new method of growth control. Other objects will become apparent from the following specification and claims.

According to the present invention, it has been discovered that the growth of plants may be suppressed by exposing a part of the growing plant to the action of 2,2,3-trichloropropionic acid or its salts. More particularly, it has been discovered that the growth of germinant seeds, emerging seedlings and established vegetation may be controlled by exposing the seeds, emerging seedlings, or the roots or above-ground portions of established vegetation to the action of a growth-inhibiting amount of 2,2,3-trichloropropionic acid or its salts. Moreover, it has been found that these compounds have a relatively high degree of toxicity for many undesirable broadleaf and narrowleaf species and a much lower toxicity for such established grasses as blue grass and creeping red fescue. Thus, the compounds may be employed for the selective control of many undesirable plant species in stands of these grasses. Further, the compounds have a high degree of persistency in soil and give excellent controls of many undesirable plant species for periods ranging up to several months.

The exposure of plants and plant parts to the action of the 2,2,3-trichloropropionic acid or its salts give rise to varying degrees of response in germinant seeds, emerging seedlings and growing plants depending upon the form and nature of the plant part contacted, the stage of growth or maturity of the plant and the dosage of toxicant compound employed. When very large dosages are dispersed in growth media a persistent inhibition of the growth of seeds, emerging seedlings and established plants is obtained. This approaches a sterilizing action. The weathering action of the sun, rain and possibly the decomposition of the toxic compounds by the action of bacteria eventually frees the growth media of the toxicant. The application of large dosages to the foliage of established vegetation suppresses the growth of most plant species and effects a substantial denuding of the soil. Soil or foliar applications of more dilute dosages suppresses the growth of the seeds or established plants of many broadleaf and narrowleaf weed species while having little or no effect upon stands of grasses such as blue grass and creeping red fescue. Thus, it is possible to effect a selective control of many undesirable weeds in established grasses of these species.

The exposure of the plant to the action of a growth inhibiting amount of the 2,2,3-trichloropropionic acid or its salts is essential for the practice of the present invention. The exact dosage to be employed to obtain such exposure is dependent upon such factors as soil type, depth to which the toxicant compounds are distributed in the soil and the amount of rainfall, as well as upon the plant species to be controlled and the stage of growth thereof. In non-selective operations, good results are obtained when the germinant seeds or established plants are exposed to dosages of from 4 to 150 pounds or more of acid equivalent of 2,2,3-trichloropropionic acid per acre. In selective applications for the suppression of the growth of many broadleaf and narrowleaf plant species in established grasses such as blue grass and creeping red fescue, a dosage of from 4 to 20 pounds of acid equivalent of 2,2,3-trichloropropionic acid per acre is desirable.

Methods and compositions employing the water soluble salts of 2,2,3-trichloropropionic acid comprise a preferred embodiment of the present invention.

The method of the present invention may be carried out by distributing the unmodified 2,2,3-trichloropropionic acid or its salts in growth media or upon the surfaces of the above ground portion of plants. However, the present method also embraces the employment of liquid or dust compositions containing the toxicants. In such usage, the toxicant compounds may be modified with one or a plurality of additaments or herbicide adjuvants including water or other liquid carriers, surface active dispersing agents and finely divided inert solids. Depending upon the concentration of toxicant, such augmented compositions are adapted to be distributed in soil or upon the above ground surfaces of plants, or to be employed as concentrates and subsequently diluted with additional inert carrier to produce the ultimate treating compositions.

The exact concentration of the 2,2,3-trichloropropionic acid or its salts to be employed in the treating compositions is not critical and may vary considerably provided the required dosage of effective agent is supplied in the growth medium or upon the plant foliage, The concentration of toxicant in liquid compositions employed to supply the desired dosage generally is from about 0.01 to 50 percent by weight, although concentrations as high as 90 percent by weight are sometimes employed. In dusts, the concentration of toxicant may be from about 0.1 to 20 percent by weight. In compositions to be employed as concentrates, the toxicants may be present in a concentration of from 5 to 95 percent by weight.

The quantity of treating composition to be applied may vary considerably provided that the required dosage of active ingredient is applied in sufficient of the finished composition to cover adequately the vegetation to be treated or to facilitate the penetration and distribution of said ingredient in growth media. The required amount of the active ingredient in the soil conveniently may be supplied per acre treated in from 10 to 27,000 gallons or more of the liquid carrier or in from 50 to 2,000 pounds of the inert solid carrier. In the treatment of seedling weeds, good coverage is obtained when using from 10 to 60 gallons of finished spray composition per acre. Where large succulent vegetation is concerned, it is frequently desirable to employ up to 250 gallons or more of the finished spray composition per acre to assure complete coverage of the above ground portion of the vegetation. In the application of dusts to plant foilage, good results are obtained with from 40 to 200 pounds of finished dust per acre, the only requirement being that the required toxicant dosage be supplied in sufficient dust to achieve good coverage of the foilage.

Liquid compositions containing the desired amount of active ingredient may be prepared by dispersing the toxicants in water or an organic liquid, with or without the aid of a suitable surface active dispersing agent such as an ionic or non-ionic emulsifying agent. Suitable organic liquid carriers include the agricultural spray oils and the petroleum distillates such as diesel fuel, kerosene, fuel oil, naphthas and Stoddard solvent. Among the latter the petroleum distillates are generally preferred. The organic liquid compositions may contain a small amount of water as a solvent for the toxicant ingredient. In such compositions, the carrier comprises an oil emulsion, i. e. a mixture of water, emulsifying agent and organic liquid. In the liquid compositions, the choice of dispersing and emulsifying agent and the amount thereof employed is dictated by the nature of the composition and by the ability of the agent to facilitate the dispersion of the toxicant compounds in the carrier to produce the desired composition. Dispersing and emulsifying agents which may be employed in the compositions include the condensation products of alkylene oxides with phenols and organic acids, alkyl aryl sulfonates, polyoxyalkylene derivatives of sorbitan esters, complex ether alcohols, mahogany soaps and the like.

In the preparation of dust compositions, the active ingredient is dispersed in and on a finely divided inert solid such as clay, talc, chalk, gypsum and the like. In such operations, the finely divided carrier is mechanically mixed or ground with the 2,2,3-trichloropropionic acid or its salts. Similarly, dust compositions containing the toxicant compounds may be prepared from various of the solid surface active dispersing agents such as bentonite, fuller's earth, attapulgite and other clays. Depending upon the proportion of ingredients, these dust compositions may be employed as concentrates and subsequently diluted with additional solid surface active dispersing agent or with chalk, talc or gypsum and the like to obtain the desired amount of active ingredient in a composition adapted to be employed for the suppression of the growth of plants. Also, such dust compositions may be dispersed in water, with or without the aid of a dispersing agent, to form spray mixtures.

When operating in accordance with the present invention, growth altering amounts of 2,2,3-trichloropropionic acid or its salts are dispersed in soil or growth media in any convenient fashion. Applications to growth media may be carried out by simply mixing with the media, by applying to the surface of soil and thereafter dragging or discing into the soil to the desired depth, or by employing a liquid carrier to accomplish the penetration and impregnation. The application of spray and dust compositions to the surface of soil or to the above ground surfaces of plants may be carried out by conventional methods, e. g. power dusters, boom and hand sprayers and spray dusters.

In a further method, the distribution of the 2,2,3-trichloropropionic acid or its salts in soil may be accomplished by introducing the toxicants in the water employed to irrigate the soil. In such procedures, the amount of water may be varied with the porosity and water holding capacity of the soil to obtain a desired depth of distribution of the toxicants.

The following examples illustrate the invention but are not to be construed as limiting:

*Example 1*

104.8 parts by weight of 2,2,3-trichloropropionic acid was dissolved in 50 parts of water and 87.8 parts of 25 percent aqueous sodium hydroxide added thereto with stirring to produce a solution of sodium 2,2,3-trichloropropionate. This solution was diluted with sufficient water to prepare a water dispersible concentrate composition containing 4 pounds acid equivalent of 2,2,3-trichloropropionic acid per gallon.

The above concentrate composition was dissolved in water to prepare an aqueous spray composition containing 8 pounds acid equivalent of 2,2,3-trichloropropionic acid per 35 gallons of ultimate mixture. This composition was applied at a rate of 35 gallons per acre to give substantially uniform coverage of seed beds heavily infested with the seeds of various annual grasses and broadleaf weeds. The annual grasses were common crab, goose grass and Brachiarea, and the broadleaf weeds were pigweed, purslane and carpet weed. Adjacent untreated but similarly infested seed beds were maintained as checks. From the time of application to observation, growth conditions were hot and dry with very light rainfall. Three weeks following the applications, the seed beds were examined to ascertain what control of the growth of germinant seeds and emerging seedlings had been obtained. The examination showed a 73 percent control of annual grasses and broadleaf weeds in the treated beds. At the time of the examination the untreated check beds were found to support vigorously growing stands of the named plant species.

*Example 2*

2,2,3-trichloropropionic acid was dispersed in water together with a small amount of a polymerized salt of substituted benzoid alkyl sulfonic acids (Daxad No. 27) to produce aqueous mixtures containing 1 percent and 2 percent by weight of the 2,2,3-trichloropropionic acid. The amount of Daxad No. 27 employed in such operations was equivalent to 0.3 gram for each 200 milliliters of mixture. The above mixtures were separately dispersed in water to prepare aqueous herbicide compositions containing, respectively, 0.018 and 0.045 percent by weight of 2,2,3-trichloropropionic acid. The latter solutions were employed for the treatment of soil and observations made of the control of the growth of the seeds and emerging seedlings of timothy and wheat. In the determinations, the compositions were employed to treat soil areas which had been prepared and seeded with the named plant species. In the treating operations, the compositions were applied as a soil drench and at a rate of about 0.305 acre inch of composition per acre to supply substantially uniform dosages of 10 and 50 pounds of 2,2,3-trichloropropionic acid per acre. These dosages correspond, respectively, to about 14.5 and 72 parts by weight of 2,2,3-trichloropropionic acid per million parts by weight of soil. Other soil areas similarly seeded were left untreated to serve as checks. At intervals, the treated areas were examined to ascertain what control of the growth of seeds and emerging seedlings had been obtained. As a result of the observations there was found a 100 percent control of the growth of the seeds and emerging seedlings of timothy and wheat in the treated areas. In the check areas substantially complete germination and growth of timothy and wheat was observed.

*Example 3*

One part by weight of 2,2,3-trichloropropionic acid, 1 part of xylene and about 0.5 part of an alkylated aryl polyether alcohol (Triton X-100) were dispersed in about 100 parts of water to produce an aqueous herbicide composition. This composition was applied to certain leaf portions of bean and corn plants which were about six inches tall and the plants thereafter observed for evidence of translocation of the propionic acid as indicated by growth inhibition at untreated growing points. In such operations, the primary leaves of the bean plants and the outer half of the leaves of the corn plants were uniformly wet with the composition. Other bean and corn plants were left untreated to serve as checks. Twenty-five days later, the treated plants were examined and compared with the untreated plants. The examination showed translocation of 2,2,3-trichloropropionic acid to the untreated growing points of the treated bean and corn plants as evidenced by inhibition of growth at these growing points.

*Example 4*

Sodium 2,2,3-trichloropropionic was dissolved in water to prepare spray compositions containing 5, 10 and 20 pounds acid equivalent of 2,2,3-trichloropropionic acid per 62.5 gallons of spray mixture. These compositions were applied to the foliage of plots of well established Kentucky blue grass and at a dosage of 62.5 gallons per acre. Adjacent untreated plots of blue grass were left untreated to serve as checks. During the first week following the application there was about 0.5 inch of rainfall and about 2.9 inches during the next three weeks. Daily examination of the plots immediately following the applications showed no evidence of injury to the blue grass resulting from the treatments. Upon examination of the plots eleven weeks following the applications, there was found about five percent fewer seed stalks of blue grass in the plots treated at 20 pounds acid equivalent of 2,2,3-trichloropropionic acid per acre than in the checks. No substantial differences could be found between the stands of blue grass in the checks and the plots treated with the lower dosages of the propionate compound. About 20 weeks after the applications, the plots were critically examined and no differences could be found between the stands of blue grass in the treated areas and the untreated checks. During the entire period of observation, the blue grass in all plots was in an active and vigorous state of growth.

*Example 5*

An aqueous solution containing 0.048 pound of 2,2,3-trichloropropionic acid per 100 gallons of ultimate mixture was employed for the treatment of soil and observations made of the effect of the treatment upon the growth of the seeds and seedlings of wheat and Japanese millet. In the determinations, the composition was employed to treat soil areas which had been prepared and seeded with the named species. In the treating operations, the composition was applied as a soil drench and at a rate of about 0.217 acre-inch of composition per acre to supply a substantially uniform dosage of 4 pounds of 2,2,3-trichloropropionic acid per acre. This dosage corresponds to about 13 parts by weight of 2,2,3-trichloropropionic acid per million parts by weight of soil. Other areas similarly seeded were left untreated to serve as checks. After four weeks, the treated areas were examined and comparisons made with the untreated check areas. Seedling wheat and millet were found to have emerged in all seed bed areas. In the untreated areas abundant and vigorously growing stands of both grass species were found. In the treated areas there was found marked inhibition of growth of both grass species with the seedlings dwarfed and severely stunted.

*Example 6*

Sodium 2,2,3-trichloropropionate was dispersed in water to prepare a composition containing 0.6 pound acid equivalent of 2,2,3-trichloropropionic acid per 100 gallons of solution. This composition was employed to treat seed beds of sandy loam soil of good nutrient content. In the treating operations, the composition was applied to the seed beds as a soil drench and at a dosage of about 0.305 acre-inch of composition per acre to distribute 50 pounds acid equivalent of 2,2,3-trichloropropionic acid per acre. Following the application, the seed beds were watered about every fourth day in an amount corresponding to about 3.2 inches of rainfall per month.

Thirty-two days after treatment, the seed beds were seeded to wheat and soybeans. Untreated seed beds were also planted to the same plant species. Two weeks after seeding, the treated beds were examined to determine the percentage control of the growth of germinant seeds and emerging seedlings. From the examination there was found a 90 percent control of the growth of the germinant seeds and emerging seedlings of wheat and soybeans in the treated areas. In the check beds, substantially complete germination and growth of soybeans and wheat was observed.

*Example 7*

Sodium 2,2,3-trichloropropionate was dissolved in water to prepare aqueous spray compositions containing 5 and 10 pounds acid equivalent of 2,2,3-trichloropropionic acid per 125 gallons of ultimate mixture. These compositions were applied to the foliage of the grass in an established lawn of Kentucky blue grass and creeping red fescue which had developed a heavy infestation of common crab grass. The treatment was carried out about ten days after the first beginnings of crab grass seedling emergence in the lawn. In the treating operations, the compositions were applied with a conventional sprayer and at a dosage of 125 gallons per acre. Adjacent untreated lawn areas were maintained as checks.

Five weeks and ten weeks after the applications, the plots were critically inspected and a 90 percent and 98 percent control of crab grass observed in the plots treated, respectively, with 5 and 10 pounds of the trichloropropionate compound per acre. The blue grass and creeping red fescue were unharmed by the treatments. At the time of the latter observation, there was found a more luxuriant stand of blue grass and creeping red fescue in the treated areas than in the check areas where the crab grass had flourished at the expense of the blue grass and fescue.

*Example 8*

One-tenth mole of 2,2,3-trichloropropionic acid is dissolved in 1745.5 grams of water and one-twentieth mole of potassium carbonate added thereto with stirring. The potassium carbonate dissolved with the evolution of carbon dioxide. The resulting solution of potassium 2,2,3-trichloropropionate contained one percent by weight acid equivalent of 2,2,3-trichloropropionic acid.

In a similar fashion, chemically equivalent proportions of zinc carbonate, magnesium carbonate, cupric carbonate, ammonia, triethylamine, tri-n-butylamine, diisopropylamine, triethanolamine, diethanolamine, monoethanolamine, monoethanol diisopropanolamine and ethylene diamine are added with stirring to separate aqueous solutions of 2,2,3-trichloropropionic acid to prepare the respective zinc, magnesium, cupric, ammonium, triethylammonium, tri-n-butylammonium, diisopropylammonium, triethanolammonium, diethanolammonium, monoethanolammonium, monoethanol diisopropanolammonium and ethylene diamine salts of 2,2,3-trichloropropionic acid. In preparing the zinc, magnesium and cupric salts the mixtures are heated to from 60° to 90° C. for a period of time with stirring to assure completion of the reaction.

Each of the above salt solutions is dispersed in water to prepare herbicide compositions containing 0.6 pound acid equivalent of one of the salts per 100 gallons of solution. These compositions are applied to separate areas of soil which have been prepared and seeded to crab grass. The applications are made at the rate of 0.305 acre-inch of composition per acre to supply a substantially uniform dosage of 50 pounds acid equivalent of one of the salts per acre. Similarly seeded soil areas are left untreated to serve as checks. After three weeks a 100 percent control of the growth of germinant seeds and emerging seedlings is found in all treated soil areas with substantially complete germination and growth of crab grass in the check areas.

Example 9

Sodium 2,2,3-trichloropropionate was dissolved in water to prepare aqueous spray compositions containing 10 and 20 pounds acid equivalent of 2,2,3-trichloropropionic acid per 125 gallons of ultimate mixture. These compositions were applied at a rate of 125 gallons per acre to give uniform coverage of seed beds which had been prepared and seeded to spring wheat, Sudan grass, German millet, Japanese millet, wild oats and radish. Adjacent untreated but similarly planted seed beds were maintained as checks. Eleven weeks following the applications, the seed beds were examined to ascertain the percentage control of the growth of seeds and emerging seedlings. The results are set forth in the following table:

| Plant species | Dosage of trichloropropionate compound in pounds acid equivalent per acre | Percent control |
|---|---|---|
| Spring wheat | 10 | 100 |
| | 20 | 100 |
| Sudan grass | 10 | 80 |
| | 20 | 90 |
| German millet | 10 | 100 |
| | 20 | 100 |
| Japanese millet | 10 | 100 |
| | 20 | 100 |
| Wild oats | 10 | 80 |
| | 20 | 90 |
| Radish | 10 | 100 |
| | 20 | 100 |

At the time of observation, the check plots showed vigorously growing stands of the named plant species.

Example 10

Sodium 2,2,3-trichloropropionate was dissolved in water to prepare an aqueous spray composition containing 10 pounds acid equivalent of 2,2,3-trichloropropionic acid per 40 gallons of ultimate mixture. This composition was applied to the foliage of seedling stands of Johnson grass, Sudan grass, brome grass, barnyard grass, crab grass, German millet, Japanese millet and barley which were from 2 to 4 inches tall. In the treating operations, the composition was applied with a conventional sprayer at 40 pounds per square inch and at a dosage of 40 gallons per acre. Prior to the application, the exposed soil surface about the crowns of the plants was covered with a thin layer of fine vermiculite to prevent the spray from reaching the surface of the soil. Several hours following the applications, the vermiculite was blown from the soil surfaces in the treated stands. Other stands of the named plant species were left untreated to serve as checks. One month following the applications, the stands were examined to ascertain the percentage control of growth of the various plant species. The results are set forth in the following table:

| Plant species | Percent control |
|---|---|
| Johnson grass | 95 |
| Sudan grass | 70 |
| Brome grass | 100 |
| Barnyard grass | 80 |
| Crab grass | 70 |
| German millet | 95 |
| Japanese millet | 100 |
| Barley | 99 |

At the time of observation, the untreated check flats showed vigorously growing stands of each named species.

Example 11

Various of the salt solutions of Example 8 and sodium 2,2,3-trichloropropionate were dispersed in water to prepare aqueous compositions containing 0.025 gram acid equivalent of one of the salts of 2,2,3-trichloropropionic acid per liter of ultimate mixture. These aqueous compositions were employed for the treatment of soil areas and observations made of the growth of seed and emerging seedlings of Japanese millet and wild oats. In the treating operations, the compositions were applied as a soil drench and at a rate of about 0.434 acre-inch of composition per acre to supply a substantially uniform dosage of 12.5 pounds acid equivalent of one of the salts per acre. The latter corresponds to about 21 parts by weight acid equivalent of the salt per million parts by weight of treated soil. Immediately prior to treatment, the soil had been prepared and seeded with the named plant species. Similarly prepared and seeded areas were left untreated to serve as checks. After three weeks, the areas were examined to ascertain what control of the growth of the seeds and emerging seedling of millet and wild oats had been obtained. The results are set forth in the following table:

| Salt of 2,2,3-trichloropropionic acid | Percent control of growth | |
|---|---|---|
| | Japanese millet | Wild oats |
| Sodium | 100 | 70 |
| Calcium | 90 | 70 |
| Ammonium | 100 | 70 |
| Monoethanolammonium | 90 | 80 |
| Triethanolammonium | 95 | 70 |

In the check areas, substantially complete germination and growth of Japanese millet and wild oats was observed.

The term "plant part" as employed in the present specification and claims is intended to be inclusive of the stems, branches, roots, foliage and germinant seeds of plants. The expression "growth media and soil" are herein employed in their broadest sense to be inclusive of all conventional "soils" as defined in Webster's New International Dictionary, second edition, unabridged, published in 1937 by G. and C. Merriam Company, Springfield, Massachusetts. Thus, the terms refer to any substance or media in which vegetation may take root and grow, and are intended to include not only earth but compost, manure, muck, humus, and sand and the like, adapted to support plant growth.

I claim:

1. A method which comprises exposing growing plants and plant parts to the action of a growth inhibiting amount of a compound selected from the group consisting of 2,2,3-trichloropropionic acid and its salts.

2. An agronomical practice which comprises impregnating soil with a growth inhibiting amount of a compound selected from the group consisting of 2,2,3-trichloropropionic acid and its salts.

3. A method which comprises applying to growing plants and plant parts a compound selected from the group consisting of 2,2,3-trichloropropionic acid and its salts, such compound being applied at a dosage of at least 4 pounds of acid equivalent per acre.

4. A method for the selective control of many weeds in established stands of blue grass and creeping red fescue which comprises applying to the foliage and plant parts of such undesirable vegetation a compound selected from the group consisting of 2,2,3-trichloropropionic acid and its salts, such compound being applied at a dosage of from 4 to 20 pounds of acid equivalent per acre.

5. A method for the selective control of many weeds in established stands of blue grass and creeping red fescue which comprises applying to the foliage and soil about the crowns of the vegetation a compound selected from the group consisting of 2,2,3-trichloropropionic acid and its salts, such compound being applied at a dosage of from 4 to 20 pounds of acid equivalent per acre.

6. A method which comprises applying to growing plants and plant parts a growth suppressing amount of a composition comprising an active toxic ingredient in admixture with a herbicide adjuvant as a carrier therefore, the active ingredient being selected from the group consisting of 2,2,3-trichloropropionic acid and its salts.

7. A method which comprises applying 2,2,3-trichloropropionic acid to growing plants and plant parts at a substantially uniform dosage of at least 4 pounds per acre.

8. A method which comprises applying sodium 2,2,3-trichloropropionate to growing plants and plant parts at a substantially uniform dosage of at least 4 pounds acid equivalent per acre.

9. A method which comprises applying a water soluble salt of 2,2,3-trichloropropionic acid to growing plants and plant parts at a substantially uniform dosage of at least 4 pounds acid equivalent per acre.

10. A herbicide composition which comprises a liquid petroleum distillate and dispersed therein a herbicidal concentration of a compound selected from the group consisting of 2,2,3-trichloropropionic acid and its salts.

11. A concentrate composition comprising an active ingredient in intimate admixture with a surface active dispersing agent, the active ingredient being selected from the group consisting of 2,2,3-trichloropropionic acid and its salts and being present in the amount of from 5 to 95 percent by weight.

12. A concentrate composition comprising an active ingredient in intimate admixture with an inert finely divided solid, the active ingredient being selected from the group consisting of 2,2,3-trichloropropionic acid and its salts and being present in the amount of from 5 to 95 percent by weight.

References Cited in the file of this patent

UNITED STATES PATENTS

| | | |
|---|---|---|
| 2,400,463 | Lichty | May 14, 1946 |
| 2,636,816 | Stewart | Apr. 28, 1953 |
| 2,642,354 | Barrons | June 16, 1953 |